United States Patent

Hones et al.

[11] Patent Number: 5,158,462
[45] Date of Patent: Oct. 27, 1992

[54] MULTIPLE-COLLISION ACCELERATION DEMONSTRATOR AND TOY

[76] Inventors: Edward W. Hones, 129 Monte Rey Dr.; Stirling A. Colgate, 422 Estante Way, both of Los Alamos, N. Mex. 87544; William G. Hones, 17953 Marine View Dr., Seattle, Wash. 98166

[21] Appl. No.: 713,261

[22] Filed: Jun. 11, 1991

[51] Int. Cl.$^5$ .............................................. G09B 23/08
[52] U.S. Cl. ...................................... 434/302; 434/300
[58] Field of Search ............... 434/276, 300, 302, 291, 434/195; 84/404, 403, 406; 116/141

[56] References Cited

U.S. PATENT DOCUMENTS

| D. 216,999 | 3/1970 | Kanbar . | |
|---|---|---|---|
| D. 217,912 | 6/1970 | Trippett . | |
| 1,177,537 | 3/1916 | Ressler | 84/404 |
| 2,705,936 | 4/1955 | Garson | 84/404 |
| 3,002,294 | 10/1961 | Jackson . | |
| 3,594,925 | 7/1971 | Abbat | 434/302 |
| 3,744,472 | 7/1973 | O'Ryan . | |
| 4,099,340 | 7/1978 | Butler | 434/300 |
| 4,237,767 | 12/1980 | Levine | 84/406 |
| 5,046,984 | 9/1991 | Cane | 434/302 X |

OTHER PUBLICATIONS

Chicago Apparatus Company, "Collision Ball Apparatus, Milvay, Improved Form", 1931, pp. 296, 294.

Primary Examiner—Richard J. Apley
Assistant Examiner—Karen Ann Richard

[57] ABSTRACT

A device comprising several highly elastic objects (for example, steel balls (14)) hanging from a support structure (12) is presented whose purpose is to demonstrate an unobvious consequence of fundamental laws of physics - the acceleration of an object to high speed by multiple collisions among a series of heavier objects moving at slower speed. The objects, each of different mass, are arrayed in close proximity in order of decreasing mass with their centers lying along a horizontal straight line. When the heaviest object, hanging at one end of the line, is pulled back a small distance, rising to some small height above its rest position, and released the resulting impact leads to a transfer of energy through the line of objects to the lightest one, at the other end of the line, which is accelerated to high velocity. When appropriately directed, this high velocity can cause the lightest object to rise to a much greater height than that from which the heaviest object was released. The preferred embodiment does not permit the lightest object to rise to its full possible height and instead uses a wind-up bar (18) to intercept its rise and cause it to return to its rest position. Other embodiments are suggested which would graphically demonstrate the high velocity given the lightest object or the large height to which it can rise.

3 Claims, 4 Drawing Sheets

MULTIPLE-COLLISION ACCELERATION DEMONSTRATOR AND TOY

BACKGROUND

1. Field of Invention

This invention generally relates to the acceleration of an object to high velocity by means of successive elastic collisions among an alignment of lower-velocity objects of higher mass.

BACKGROUND

2. Description of Prior Art

The act of accelerating an object to high velocity and/or projecting it long distances or to great heights or with high directional precision is a perennial source of human satisfaction, amusement and recreation, and is the basis for most of the countless "ball" games such as baseball, golf, billiards, pin-ball machines, etc. In nearly all such cases the object is accelerated by collision with another object and the outcome of the collision is determined by two basic laws of physics—the law of the conservation of energy and the law of the conservation of momentum.

The invention described here is yet another "ball" game—one that involves not just a single collision but utilizes multiple collisions among several objects arranged in a straight line to demonstrate a remarkable consequence of the conservation laws—that an object can be accelerated to high speed as a consequence of successive collisions occurring among a series of heavier, slowermoving objects. The principal of the invention is illustrated in FIG. 1 which shows a series of highly elastic balls (for example, steel) of progressively diminishing size (weight) suspended with their centers aligned horizontally. When the heaviest ball is pulled back and released, gaining kinetic energy from the force of gravity as it falls, the successive collisions among the balls result in the smallest ball's departing with many times the velocity of the first ball and rising to a much greater height. The theoretical basis for the invention is set forth in the specification.

A patentability search has yielded no prior art against which this invention actually infringes. U.S. Pat. 3,002,294 to Jackson (1961), U.S. Pat. No. 217,912 to Trippett (1970) and U.S. Pat. No. 216,999 to Kanbar (1970) are all versions of the long-familiar toy or demonstration device which has an alignment of suspended steel balls all of equal mass. Pulling back and releasing one or more balls at one end of the line produces a series of impacts that causes the same number of balls from the other end of the line to rise to the same height the first balls were raised to. These patents do not address the much different results that are obtained with balls of unequal masses.

U.S. Pat. No. 3,744,472 to O'Ryan (1973) shows a series of two or more "resilient balls" of decreasing size in a vertical array, the largest at the bottom and the smallest at the top, each ball having a socket at its top to receive the ball above. Imparting an upward blow to (as by kicking) the bottom ball causes the smallest ball to depart upward with substantial velocity. That patent describes the balls only in terms of their sizes and "resilience," with no mention made of their weights nor of an important quantity, the coefficient of restitution, which will be defined in our specification. Thus O'Ryan's "Multiple-Ball and Projectile Toy" is not specified in meaningful, clear, concise, or exact physical terms that would enable a skilled person to produce it.

OBJECTS AND ADVANTAGES

The objects and advantages of the present invention are:

(a) to provide a demonstration of consequences of the laws of conservation of energy and conservation of momentum;

(b) to demonstrate that these laws, operating in multiple collisions of highly elastic objects, permit the transformation of the kinetic energy of a heavy, slowmoving object into high velocity of a lighter object;

(c) to embody these demonstration functions in a toy for educational entertainment and amusement;

(d) to make the toy's operation simple and easily repeatable by incorporating a "wind-up bar" that will automatically catch and stop the last ball and cause it to return to its rest position.

DRAWING FIGURES

REFERENCE NUMERALS IN DRAWINGS

10: base of the apparatus
12: support bars
14: steel balls
16: strings supporting steel balls
18: wind-up bar

THEORY OF THE INVENTION

Figure 1:
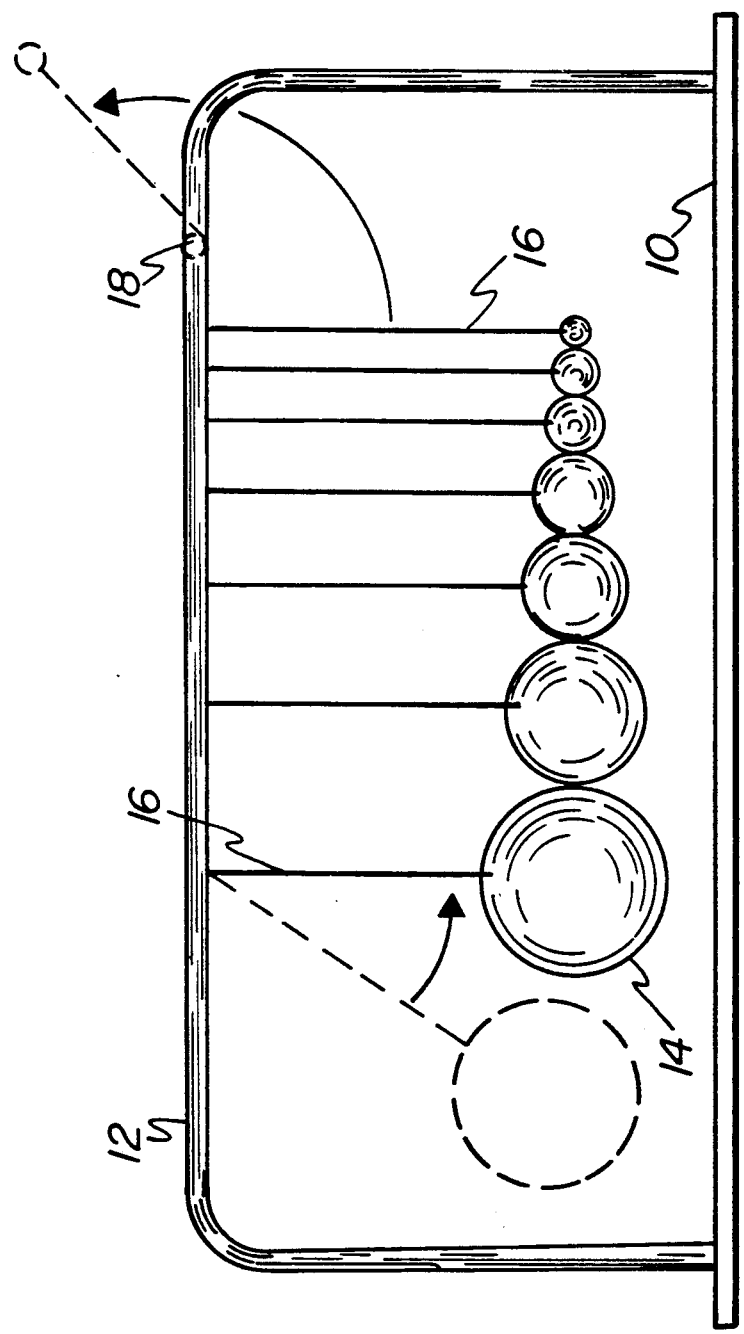
FIG. 1 is a sketch illustrating the behavior of the invention when the heaviest ball is pulled back from its rest position and released.

FIG. 1 illustrates the basic functioning of the invention under the laws of conservation of energy and conservation of momentum. A number of highly elastic objects are suspended from a support with their centers of mass aligned in a straight line. The masses of the objects decrease from left to right such that the ratio, f, of the mass of one object to the mass of the object on its left is less than 1 and, for the sake of this discussion, is the same for each pair of objects. In the embodiment of the invention described here the objects are solid steel spheres although other shapes and materials could be used. The number of objects (7) shown also could be different.

When a moving elastic sphere (sphere 1), moving with an initial velocity $U_1$ strikes another elastic sphere (sphere 2) which is initially at rest ($U_2=0$), along their line of centers, the final velocities, $V_1$ and $V_2$ of spheres 1 and 2, dictated by the laws of conservation of energy and momentum are:

$$V_1 = \left(\frac{1-ef}{1+f}\right)U_1 \quad (1)$$

$$V_2 = \left(\frac{1+e}{1+f}\right)U_1 \quad (2)$$

Here f is the mass ratio, $m_2/m_1$. e is the coefficient of restitution, defined by the equation $$e = \frac{V_2 - V_1}{U_1 - U_2} \quad (3)$$

e is a positive fraction and is a measure of the elasticity of a pair of colliding objects. For highly elastic materials (such as steel) e is nearly 1 while for plastic substances such as clay it is nearly zero. In a system of several colliding spheres, as in FIG. 1, where e and f are non-varying from collision to collision, the equation (2) can be applied to each collision in the series such that, for the situation illustrated in FIG. 1 the velocity, $V_7$, with which the lightest ball departs is related to the initial impact velocity, $U_1$ of the heaviest ball by (recalling that there will be 6 collisions):

$$V_7 = \left(\frac{1+e}{1+f}\right)^6 U_i \quad (4)$$

If the heaviest ball is given its velocity, $U_1$ by being raised to, and released from, a height, $h_1$ then the seventh ball will rise to a height, $h_7 = (V_7/U_1)^2 h_1$. If we define the total mass ratio, R, as $m_1/m_7$, then f, the uniform ball-to-ball mass decrement, is:

$$f = \frac{1}{\sqrt[6]{R}} \quad (5)$$

Figure 2A:
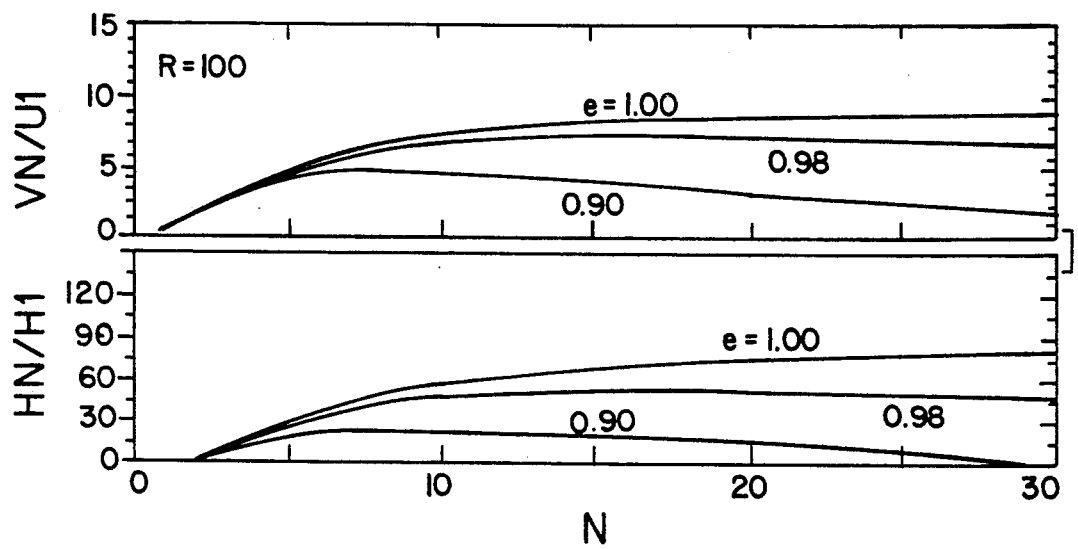
FIGS. 2A and 2B show final-to-initial velocity ratios and final-to-initial height ratios for initial-to-final mass ratios of 100 and 150.
Figure 2B:
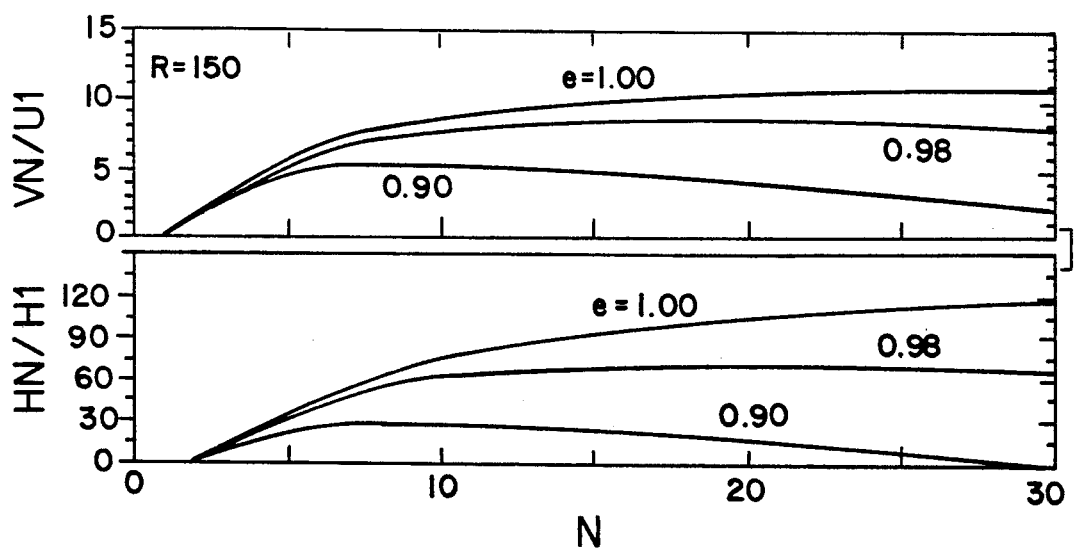
Figure 3A:
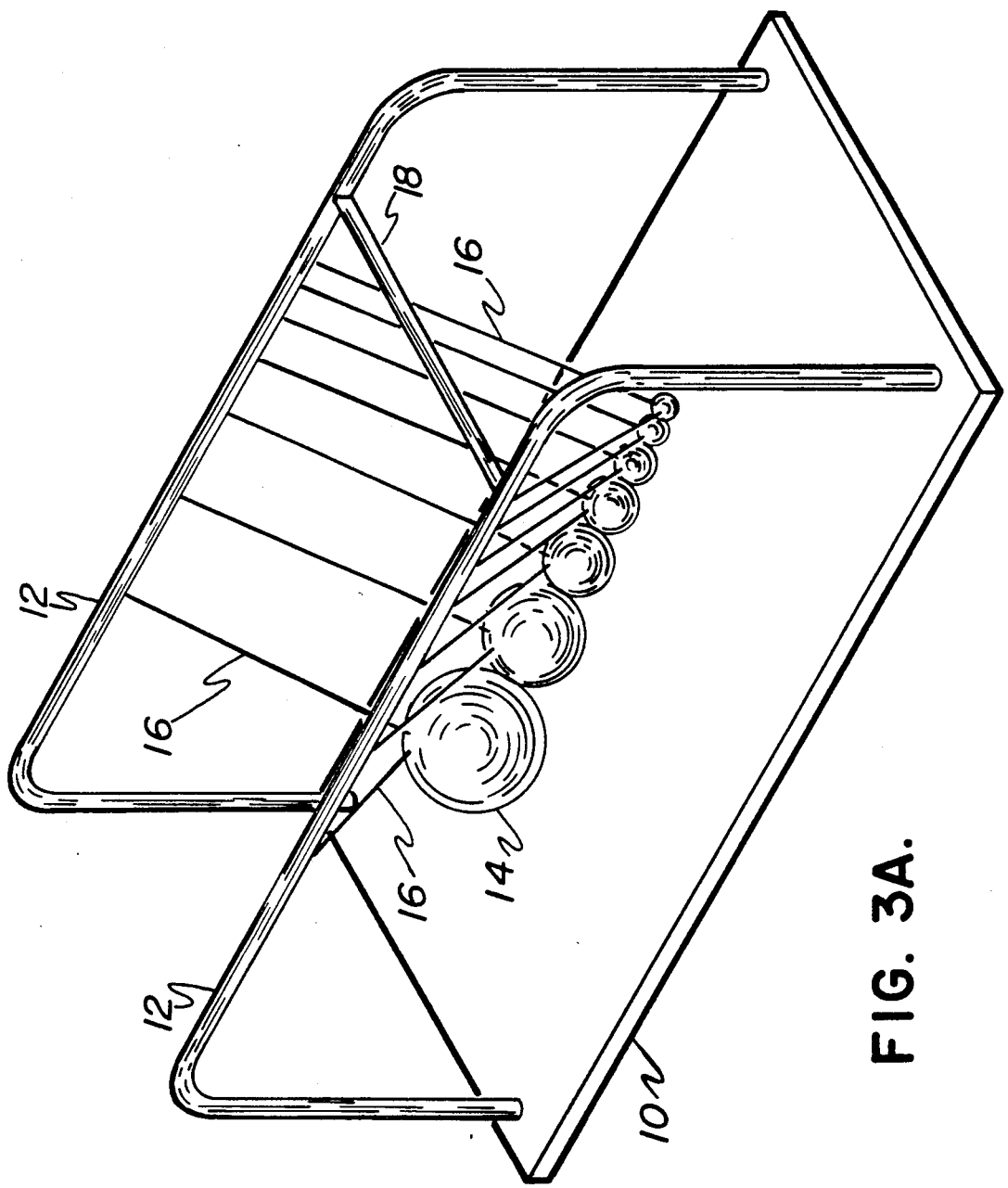
FIGS. 3A to 3D show various views of the preferred embodiment of the invention.
Figure 3C:
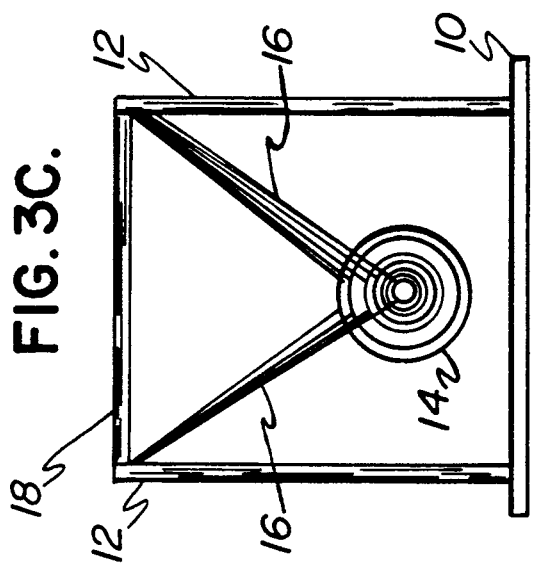
Figure 3B:
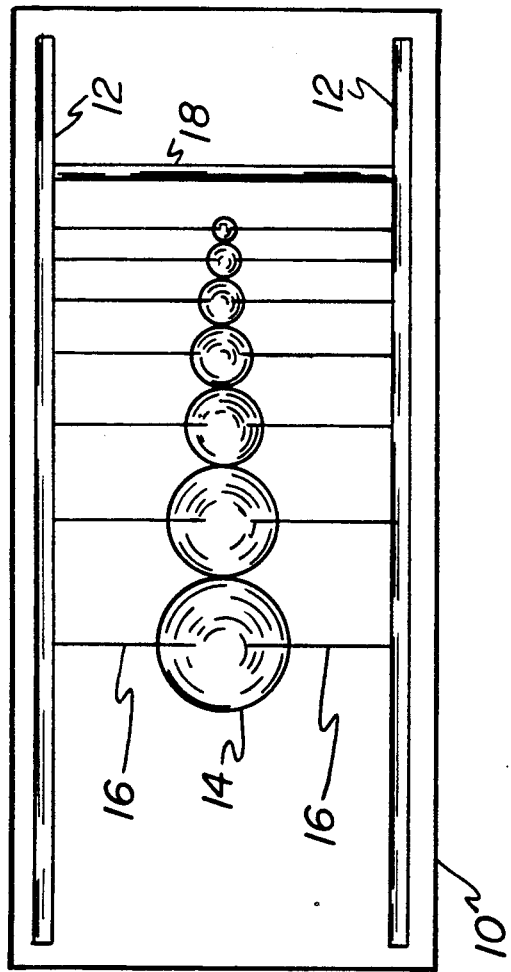
Figure 3D:
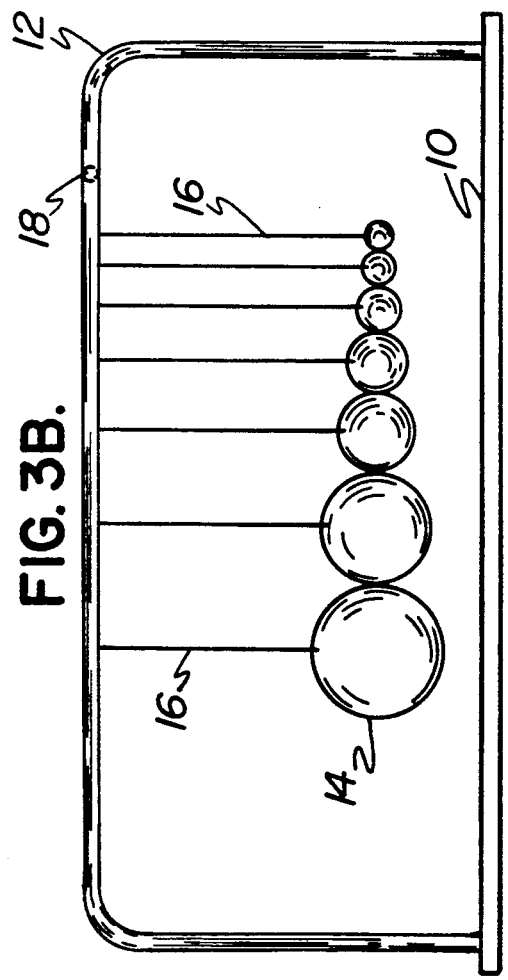

FIGS. 2A and 2B show the velocity ratios, $V_n/U_1$ and height ratios $h_n/h_1$ as a function of the number, n, of balls for three values of e and for two different total mass ratios, $R = 100$ and $R = 150$. First, the curves show that, generally, larger total mass ratios provide greater velocity ratios and height ratios. But for a given R, these ratios depend strongly upon the number of balls, especially up through about 10. Decreasing values of e, the coefficient of restitution, reduce the ratios especially as the number of balls increases beyond 5 or 10. For our preferred embodiment we have chosen seven steel balls (e about 0.98) with a total mass ratio, R, of about 150 which give $V_7/U_1 = 6.9$ and $h_7/h_1 = 48$.

OPERATION—FIGS. 3A-3D

The preferred embodiment of the invention is shown in FIGS. 3A-3D. Parallel support rods 12 are fastened to a base 10 and strings 16 attached to the support rods are, in turn attached in pairs to the steel balls 14, forming yoke-like supports for these whose dimensions and placements along the support rods are adjusted so that the balls barely touch each other and their centers are aligned in a straight line which is parallel to the plane of the base and precisely above and parallel to the centerline between the two parallel support rods 12. A wind-up bar 18 of highly elastic material (for example, steel) extends between the support rods and is fastened to them some distance from the supports for the lightest ball in the direction away from the line of balls.

The manner of using the invention is as sketched in FIG. 1. The heaviest ball is pulled back away from the line of balls and is thus raised some distance above the line of centers. When released, the heaviest ball then swings downward and, as it reaches the line of centers, impacts the next ball with the velocity it has acquired from the force of gravity during its downward swing. The impact is transferred at very high speed through the line of balls so that the lightest ball receives a large fraction of the kinetic energy that the large ball acquired in its fall and is projected at high speed in an upward arc. When this lightest ball reaches the height of the tops of the support rods 12 its supporting strings 16 encounter the wind-up rod 18 and wind around it, the ball following a spiral path inward toward the wind-up bar. After making several turns around the wind-up bar the ball strikes the bar and rebounds, retracing its spiral path outward until, when it is unwound, it strikes the line of balls and comes to approximate rest. The device is then ready to be reactivated by again pulling the heaviest ball back and releasing it.

Variety in the behavior of the device is provided by pulling back the heaviest ball smaller or larger distances, the larger distances producing greater initial impacts and thus more violent motion of the lightest ball as its supporting strings wind and then unwind around the wind-up bar.

SUMMARY, RAMIFICATIONS AND SCOPE

The reader will see that the invention described here has aspects both of an instrument for demonstrating consequences of fundamental laws of nature—the laws of conservation of energy and of conservation of momentum, and of a toy or device for entertainment and amusement. Both as a demonstration and as an amusement device it finds its appeal in the unexpectedness or unobviousness of the fact that the heaviest ball, impacting the line of balls at a relatively slow velocity, can cause the little ball to acquire a velocity many times greater (seven times greater in the embodiment presented here). The effect is, perhaps, even more amazing when the ratio of heights is noted (see FIG. 2) since the height ratio is equal to the square of the velocity ratio. Thus, in the present embodiment the little ball, if not constrained by the shortness of its supporting strings, would rise to a height of about 4 feet when the large ball is released from a height of one inch.

The scope of the invention should not be considered limited by the many specificities of the above description; these simply provide an illustration of the functioning of the invention in its presently preferred embodiment. For example, in another embodiment the little ball could be suspended from a high "tower" by means of long strings to allow the ball to rise to the full height consistent with its high velocity, thus demonstrating the large ratio $h_n/h_1$. Or the little ball could be free, supported on a pedestal from which it would be projected on a ballistic trajectory by the impact. The ball-to-ball mass decrement could be achieved by using balls of different materials and/or degrees of hollowness rather than simply of different size. The balls could be replaced by elastic objects of other suitable shapes, for example ellipsoids or cubes. Also the objects, when at rest, need not be in contact but only close enough that their swinging motion will not raise their centers substantially above the at-rest line of centers.

Thus the scope of the invention should be determined by the appended claims and their legal equivalents, rather than by the example given.

We claim:

1. A multiple-collision acceleration demonstrator and toy comprising a series of at least three objects of highly elastic material hanging by suitable suspension elements from a support structure such that said objects are lightly touching or in close proximity to each other with the centers of said objects lying in a horizontal straight line parallel to the support structure, said objects being each of different size with the largest object at one end of the line of centers, the smallest object at the other end of the line of centers and the size of each object in the series of objects decreasing monotonically from object to object between the largest object and the smallest object.

2. The demonstrator and toy of claim 1 wherein said demonstrator and toy has a wind-up bar, tower, pedestal or other device to direct, limit or constrain the trajectory of said smallest object when it has been accelerated by the energy transferred through said line of objects from the impact of said largest object, said direction, limitation or constraint being configured so as to provide graphic evidence of consequences of said transfer of energy and to assure simplicity of repeated operation of said demonstrator and toy.

3. The demonstrator and toy of claim 1 wherein said largest object is the most massive object in the series of objects and the smallest object is the least massive object in the series of objects and the mass of each object in the series of objects decreases monotonically from object to object between the largest object and the smallest object.

* * * * *